US009537896B2

(12) United States Patent
Wallis et al.

(10) Patent No.: US 9,537,896 B2
(45) Date of Patent: *Jan. 3, 2017

(54) METHOD FOR PROVIDING WIRELESS APPLICATION PRIVILEGE MANAGEMENT

(71) Applicant: BlackBerry Limited, Waterloo (CA)

(72) Inventors: Kenneth Wallis, Pleasanton, CA (US); Bryan Richard Goring, Wellesley (CA); Viera Bibr, Kilbride (CA); Kamen Vitanov, Mississauga (CA); Laura Brindusa Fritsch, El Granada, CA (US); Michael Shenfield, Richmond Hill (CA); Jeffrey Christopher Rogers, Toronto (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/698,137

(22) Filed: Apr. 28, 2015

(65) Prior Publication Data

US 2015/0244740 A1    Aug. 27, 2015

Related U.S. Application Data

(63) Continuation of application No. 13/719,388, filed on Dec. 19, 2012, now Pat. No. 9,059,891, which is a
(Continued)

(51) Int. Cl.
*H04L 29/06* (2006.01)
*H04L 12/24* (2006.01)
(Continued)

(52) U.S. Cl.
CPC .............. *H04L 63/20* (2013.01); *H04L 41/00* (2013.01); *H04L 41/0893* (2013.01);
(Continued)

(58) Field of Classification Search
CPC ...... H04L 63/20; H04L 63/105; H04L 63/102; H04L 63/108; H04L 63/10
(Continued)

(56) References Cited

U.S. PATENT DOCUMENTS 4,106,060 A    8/1978  Chapman, Jr.
4,417,349 A    11/1983 Hills et al.
(Continued)

FOREIGN PATENT DOCUMENTS

AU    7843498      2/1999
DE    19961345    12/1999
(Continued)

OTHER PUBLICATIONS

European Patent Office, Extended European Search Report issued Jan. 15, 2013 in respect of European Patent Application No. 12194378.1-2416.
(Continued)

*Primary Examiner* — Kambiz Zand
*Assistant Examiner* — Stephen Sanders
(74) *Attorney, Agent, or Firm* — Ridout & Maybee LLP

(57) ABSTRACT

A method for providing an administration policy to a user device comprising a plurality of applications, the method comprising centrally generating the administration policy to be implemented in the user device, the administration policy comprising at least one of an application administration policy to be used by at least one of the plurality of applications and a client administration policy for the user device; and providing the generated policy to the user device.

29 Claims, 7 Drawing Sheets

Related U.S. Application Data continuation of application No. 11/189,113, filed on Jul. 26, 2005, now Pat. No. 8,365,240.

(60) Provisional application No. 60/672,084, filed on Apr. 18, 2005.

(51) Int. Cl.
  *H04W 12/08* (2009.01)
  *H04W 48/08* (2009.01)
  *H04W 88/02* (2009.01)
  *H04L 29/08* (2006.01)

(52) U.S. Cl.
  CPC ........... *H04L 63/102* (2013.01); *H04W 12/08* (2013.01); *H04L 67/34* (2013.01); *H04W 48/08* (2013.01); *H04W 88/02* (2013.01)

(58) Field of Classification Search
  USPC .......................................................... 726/1
  See application file for complete search history.

(56) References Cited

U.S. PATENT DOCUMENTS

| | | | |
|---|---|---|---|
| 4,438,433 A | 3/1984 | Smoot et al. | |
| 4,558,454 A | 12/1985 | Hills et al. | |
| 4,644,351 A | 2/1987 | Zabarsky et al. | |
| 4,695,880 A | 9/1987 | Johnson et al. | |
| 4,697,281 A | 9/1987 | O'Sullivan | |
| 4,713,780 A | 12/1987 | Schultz et al. | |
| 4,768,087 A | 8/1988 | Taub et al. | |
| 4,837,798 A | 6/1989 | Cohen et al. | |
| 4,837,800 A | 6/1989 | Freeburg et al. | |
| 4,845,658 A | 7/1989 | Gifford | |
| 4,856,047 A | 8/1989 | Saunders | |
| 4,928,096 A | 5/1990 | Leonardo et al. | |
| 4,951,044 A | 8/1990 | Nelson et al. | |
| 4,972,457 A | 11/1990 | O'Sullivan | |
| 4,980,907 A | 12/1990 | Raith et al. | |
| 5,008,926 A | 4/1991 | Misholi | |
| 5,043,721 A | 8/1991 | May | |
| 5,068,916 A | 11/1991 | Harrison et al. | |
| 5,086,502 A | 2/1992 | Malcolm | |
| 5,125,021 A | 6/1992 | Lebowitz | |
| 5,127,041 A | 6/1992 | O'Sullivan | |
| 5,128,981 A | 7/1992 | Tsukamoto et al. | |
| 5,136,291 A | 8/1992 | Teague | |
| 5,157,660 A | 10/1992 | Kuwahara et al. | |
| 5,159,592 A | 10/1992 | Perkins | |
| 5,177,680 A | 1/1993 | Tsukino et al. | |
| 5,181,200 A | 1/1993 | Harrison | |
| 5,210,785 A | 5/1993 | Sato et al. | |
| 5,265,033 A | 11/1993 | Vajk et al. | |
| 5,283,887 A | 2/1994 | Zachery | |
| 5,293,250 A | 3/1994 | Okumura et al. | |
| 5,299,255 A | 3/1994 | Iwaki et al. | |
| 5,307,059 A | 4/1994 | Connary et al. | |
| 5,313,582 A | 5/1994 | Hendel et al. | |
| 5,315,635 A | 5/1994 | Kane et al. | |
| 5,333,152 A | 7/1994 | Wilber | |
| 5,333,266 A | 7/1994 | Boaz et al. | |
| 5,370,566 A | 12/1994 | Mitchell, Jr. et al. | |
| 5,392,390 A | 2/1995 | Crozier | |
| 5,406,557 A | 4/1995 | Baudoin | |
| 5,410,543 A | 4/1995 | Seitz et al. | |
| 5,416,473 A | 5/1995 | Dulaney, III et al. | |
| 5,416,842 A | 5/1995 | Aziz | |
| 5,436,960 A | 7/1995 | Campana, Jr. et al. | |
| 5,438,611 A | 8/1995 | Campana, Jr. et al. | |
| 5,452,356 A | 9/1995 | Albert | |
| 5,479,472 A | 12/1995 | Campana, Jr. et al. | |
| 5,487,100 A | 1/1996 | Kane | |
| 5,493,692 A | 2/1996 | Theimer et al. | |
| 5,495,484 A | 2/1996 | Self et al. | |
| 5,548,789 A | 8/1996 | Nakanura | |
| 5,559,800 A | 9/1996 | Mousseau et al. | |
| 5,572,528 A | 11/1996 | Shuen | |
| 5,579,472 A | 11/1996 | Keyworth, II et al. | |
| 5,588,009 A | 12/1996 | Will | |
| 5,598,536 A | 1/1997 | Slaughter, III et al. | |
| 5,603,054 A | 2/1997 | Theimer et al. | |
| 5,604,491 A | 2/1997 | Coonley et al. | |
| 5,604,788 A | 2/1997 | Tett | |
| 5,613,108 A | 3/1997 | Morikawa | |
| 5,625,670 A | 4/1997 | Campana, Jr. et al. | |
| 5,627,829 A | 5/1997 | Gleeson et al. | |
| 5,630,060 A | 5/1997 | Tang et al. | |
| 5,631,946 A | 5/1997 | Campana, Jr. et al. | |
| 5,633,810 A | 5/1997 | Mandal et al. | |
| 5,638,450 A | 6/1997 | Robson | |
| 5,666,530 A | 9/1997 | Clark et al. | |
| 5,666,553 A | 9/1997 | Crozier | |
| 5,673,322 A | 9/1997 | Pepe et al. | |
| 5,701,423 A | 12/1997 | Crozier | |
| 5,705,995 A | 1/1998 | Laflin et al. | |
| 5,706,211 A | 1/1998 | Beletic et al. | |
| 5,727,202 A | 3/1998 | Kucala | |
| 5,729,735 A | 3/1998 | Meyering | |
| 5,737,531 A | 4/1998 | Ehley | |
| 5,742,905 A | 4/1998 | Pepe et al. | |
| 5,745,689 A | 4/1998 | Yeager et al. | |
| 5,751,960 A | 5/1998 | Matsunaga | |
| 5,751,971 A | 5/1998 | Dobbins et al. | |
| 5,754,954 A | 5/1998 | Cannon et al. | |
| 5,757,901 A | 5/1998 | Hiroshige | |
| 5,758,088 A | 5/1998 | Bezaire et al. | |
| 5,758,150 A | 5/1998 | Bell et al. | |
| 5,761,416 A | 6/1998 | Mandal et al. | |
| 5,764,639 A | 6/1998 | Staples et al. | |
| 5,764,899 A | 6/1998 | Eggleston et al. | |
| 5,765,170 A | 6/1998 | Morikawa | |
| 5,771,353 A | 6/1998 | Eggleston et al. | |
| 5,781,614 A | 7/1998 | Brunson | |
| 5,781,901 A | 7/1998 | Kuzma | |
| 5,790,790 A | 8/1998 | Smith et al. | |
| 5,790,974 A | 8/1998 | Tognazzini | |
| 5,796,806 A | 8/1998 | Birckbichler | |
| 5,812,671 A | 9/1998 | Ross, Jr. | |
| 5,812,773 A | 9/1998 | Norin | |
| 5,812,819 A | 9/1998 | Rodwin et al. | |
| 5,813,016 A | 9/1998 | Sumimoto | |
| 5,815,081 A | 9/1998 | Motohashi | |
| 5,819,172 A | 10/1998 | Campana, Jr. et al. | |
| 5,819,284 A | 10/1998 | Farber et al. | |
| 5,822,434 A | 10/1998 | Caronni et al. | |
| 5,826,062 A | 10/1998 | Fake, Jr. et al. | |
| 5,838,252 A | 11/1998 | Kikinis | |
| 5,838,926 A | 11/1998 | Yamagishi | |
| 5,844,969 A | 12/1998 | Goldman et al. | |
| 5,850,219 A | 12/1998 | Kumomura | |
| 5,850,444 A | 12/1998 | Rune | |
| 5,862,321 A | 1/1999 | Lamming et al. | |
| 5,867,660 A | 2/1999 | Schmidt et al. | |
| 5,878,434 A | 3/1999 | Draper et al. | |
| 5,881,235 A | 3/1999 | Mills | |
| 5,889,845 A | 3/1999 | Staples et al. | |
| 5,903,723 A | 5/1999 | Beck et al. | |
| 5,905,777 A | 5/1999 | Foladare et al. | |
| 5,917,629 A | 6/1999 | Hortensius et al. | |
| 5,928,329 A | 7/1999 | Clark et al. | |
| 5,937,161 A | 8/1999 | Mulligan et al. | |
| 5,941,954 A | 8/1999 | Kalajan | |
| 5,941,956 A | 8/1999 | Shirakihara et al. | |
| 5,943,426 A | 8/1999 | Frith et al. | |
| 5,948,066 A | 9/1999 | Whalen et al. | |
| 5,951,636 A | 9/1999 | Zerber | |
| 5,953,322 A | 9/1999 | Kimball | |
| 5,958,006 A | 9/1999 | Eggleston et al. | |
| 5,961,590 A | 10/1999 | Mendez et al. | |
| 5,964,833 A | 10/1999 | Kikinis | |
| 5,966,663 A | 10/1999 | Gleason | |
| 5,968,131 A | 10/1999 | Mendez et al. | |
| 5,969,636 A | 10/1999 | Parvulescu et al. | |
| 5,973,612 A | 10/1999 | Deo et al. | |

(56) References Cited

U.S. PATENT DOCUMENTS

| | | | |
|---|---|---|---|
| 5,974,180 A | 10/1999 | Schwendeman | |
| 5,974,238 A | 10/1999 | Chase, Jr. | |
| 5,978,689 A | 11/1999 | Tuoriniemi et al. | |
| 5,978,837 A | 11/1999 | Foladare et al. | |
| 5,983,073 A | 11/1999 | Ditzik | |
| 5,987,508 A | 11/1999 | Agraharam et al. | |
| 5,995,597 A | 11/1999 | Woltz et al. | |
| 6,000,000 A | 12/1999 | Hawkins et al. | |
| 6,006,274 A | 12/1999 | Hawkins et al. | |
| 6,009,173 A | 12/1999 | Sumner | |
| 6,014,429 A | 1/2000 | Laporta et al. | |
| 6,018,762 A | 1/2000 | Brunson et al. | |
| 6,023,700 A | 2/2000 | Owens et al. | |
| 6,023,708 A | 2/2000 | Mendez et al. | |
| 6,034,621 A | 3/2000 | Kaufman | |
| 6,035,104 A | 3/2000 | Zahariev | |
| 6,052,442 A | 4/2000 | Cooper et al. | |
| 6,052,563 A | 4/2000 | Macko | |
| 6,052,735 A | 4/2000 | Ulrich et al. | |
| 6,058,431 A | 5/2000 | Srisuresh et al. | |
| 6,067,561 A | 5/2000 | Dillon | |
| 6,072,862 A | 6/2000 | Srinivasan | |
| 6,073,137 A | 6/2000 | Brown et al. | |
| 6,073,165 A | 6/2000 | Narasimhan et al. | |
| 6,078,826 A | 6/2000 | Croft et al. | |
| 6,084,969 A | 7/2000 | Wright et al. | |
| 6,085,192 A | 7/2000 | Mendez et al. | |
| 6,085,231 A | 7/2000 | Agraharam et al. | |
| 6,085,232 A | 7/2000 | Kikinis | |
| 6,091,951 A | 7/2000 | Sturniolo et al. | |
| 6,092,114 A | 7/2000 | Shaffer et al. | |
| 6,092,191 A | 7/2000 | Shimbo et al. | |
| 6,101,531 A | 8/2000 | Eggleston et al. | |
| 6,112,244 A | 8/2000 | Moore et al. | |
| 6,115,394 A | 9/2000 | Balachandran et al. | |
| 6,115,736 A | 9/2000 | Devarakonda et al. | |
| 6,119,167 A | 9/2000 | Boyle et al. | |
| 6,122,503 A | 9/2000 | Daly | |
| 6,125,281 A | 9/2000 | Wells et al. | |
| 6,125,369 A | 9/2000 | Wu et al. | |
| 6,128,739 A | 10/2000 | Fleming, III | |
| 6,130,892 A | 10/2000 | Short et al. | |
| 6,131,096 A | 10/2000 | Ng et al. | |
| 6,131,116 A | 10/2000 | Riggins et al. | |
| 6,134,432 A | 10/2000 | Holmes et al. | |
| 6,138,146 A | 10/2000 | Moon et al. | |
| 6,141,690 A | 10/2000 | Weiman | |
| 6,144,671 A | 11/2000 | Perinpanathan et al. | |
| 6,144,997 A | 11/2000 | Lamming et al. | |
| 6,151,606 A | 11/2000 | Mendez | |
| 6,154,839 A | 11/2000 | Arrow et al. | |
| 6,157,318 A | 12/2000 | Minata | |
| 6,157,630 A | 12/2000 | Adler et al. | |
| 6,157,950 A | 12/2000 | Krishnan | |
| 6,163,274 A | 12/2000 | Lindgren | |
| 6,167,379 A | 12/2000 | Dean et al. | |
| 6,170,057 B1 | 1/2001 | Inoue et al. | |
| 6,178,331 B1 | 1/2001 | Holmes et al. | |
| 6,185,603 B1 | 2/2001 | Henderson et al. | |
| 6,195,546 B1 | 2/2001 | Leung et al. | |
| 6,219,694 B1 | 4/2001 | Lazaridis et al. | |
| 6,233,341 B1 | 5/2001 | Riggins | |
| 6,240,088 B1 | 5/2001 | Gayton et al. | |
| 6,249,820 B1 | 6/2001 | Dobbins et al. | |
| 6,256,666 B1 | 7/2001 | Singhal | |
| 6,272,545 B1 | 8/2001 | Flanagin et al. | |
| 6,275,848 B1 | 8/2001 | Arnold | |
| 6,275,850 B1 | 8/2001 | Beyda et al. | |
| 6,292,668 B1 | 9/2001 | Alanara et al. | |
| 6,311,282 B1 | 10/2001 | Nelson et al. | |
| 6,314,519 B1 | 11/2001 | Davis et al. | |
| 6,324,544 B1 | 11/2001 | Alam et al. | |
| 6,324,587 B1 | 11/2001 | Trenbeath et al. | |
| 6,349,306 B1 | 2/2002 | Malik et al. | |
| 6,356,956 B1 | 3/2002 | Deo et al. | |
| 6,381,454 B1 | 4/2002 | Tiedemann et al. | |
| 6,400,958 B1 | 6/2002 | Isomursu et al. | |
| 6,449,287 B1 | 9/2002 | Leuca et al. | |
| 6,470,358 B1 | 10/2002 | Beyda et al. | |
| 6,487,560 B1 | 11/2002 | LaRue et al. | |
| 6,549,770 B1 | 4/2003 | Marran | |
| 6,701,378 B1 | 3/2004 | Gilhuly et al. | |
| 6,708,187 B1 | 3/2004 | Shanumgam et al. | |
| 6,714,515 B1 | 3/2004 | Marchand | |
| 6,775,559 B1 | 8/2004 | Weghorst et al. | |
| 6,880,005 B1 | 4/2005 | Bell et al. | |
| 7,317,699 B2 * | 1/2008 | Godfrey | H04L 29/06 370/254 |
| 7,363,388 B2 | 4/2008 | Huang et al. | |
| 7,404,203 B2 * | 7/2008 | Ng | G06F 21/6227 713/165 |
| 7,461,395 B2 * | 12/2008 | Ng | G06F 21/10 726/1 |
| 8,134,954 B2 | 3/2012 | Godfrey et al. | |
| 8,259,611 B2 | 9/2012 | Godfrey et al. | |
| 2001/0001552 A1 | 5/2001 | Vong et al. | |
| 2001/0015977 A1 | 8/2001 | Johansson | |
| 2001/0029531 A1 | 10/2001 | Ohta | |
| 2001/0040693 A1 | 11/2001 | Saito et al. | |
| 2001/0042093 A1 | 11/2001 | Shirai | |
| 2001/0054072 A1 | 12/2001 | Discolo et al. | |
| 2002/0059380 A1 | 5/2002 | Biliris et al. | |
| 2002/0091939 A1 | 7/2002 | Garrison et al. | |
| 2002/0131404 A1 | 9/2002 | Mehta et al. | |
| 2002/0160763 A1 | 10/2002 | Mittal et al. | |
| 2002/0194317 A1 | 12/2002 | Kanada et al. | |
| 2003/0008662 A1 | 1/2003 | Stern et al. | |
| 2003/0046434 A1 | 3/2003 | Flanagin et al. | |
| 2003/0074430 A1 | 4/2003 | Gieseke et al. | |
| 2003/0081621 A1 | 5/2003 | Godfrey et al. | |
| 2003/0229501 A1 | 12/2003 | Copeland et al. | |
| 2004/0215481 A1 | 10/2004 | Nishi | |
| 2005/0190764 A1 | 9/2005 | Shell et al. | |

FOREIGN PATENT DOCUMENTS

| | | |
|---|---|---|
| EP | 0617373 | 9/1994 |
| EP | 0736989 | 10/1996 |
| EP | 0772327 | 5/1997 |
| EP | 0777394 | 6/1997 |
| EP | 0788287 | 8/1997 |
| EP | 0793387 | 9/1997 |
| EP | 0825788 | 2/1998 |
| EP | 0838774 | 4/1998 |
| EP | 0838934 | 4/1998 |
| EP | 0918417 | 5/1999 |
| EP | 0930766 | 7/1999 |
| EP | 0986225 | 3/2000 |
| JP | 9305155 | 1/1997 |
| JP | 9214556 | 8/1997 |
| JP | 11289346 | 10/1999 |
| WO | 9619064 | 6/1996 |
| WO | 9726709 | 7/1997 |
| WO | 9727717 | 7/1997 |
| WO | 9732251 | 9/1997 |
| WO | 9733421 | 9/1997 |
| WO | 9741654 | 11/1997 |
| WO | 9744942 | 11/1997 |
| WO | 9800787 | 1/1998 |
| WO | 9821911 | 5/1998 |
| WO | 9823108 | 5/1998 |
| WO | 9826344 | 6/1998 |
| WO | 9848560 | 10/1998 |
| WO | 9905620 | 2/1999 |
| WO | 9905813 | 2/1999 |
| WO | 9906900 | 2/1999 |
| WO | 9912365 | 3/1999 |
| WO | 9917505 | 4/1999 |
| WO | 9919988 | 4/1999 |
| WO | 9936870 | 7/1999 |
| WO | 9945484 | 9/1999 |
| WO | 9945684 | 9/1999 |
| WO | 9948312 | 9/1999 |
| WO | 9950974 | 10/1999 |

(56) References Cited

FOREIGN PATENT DOCUMENTS

| WO | 9963709 | 12/1999 |
|---|---|---|
| WO | 0011567 | 3/2000 |
| WO | 0011832 | 3/2000 |
| WO | 0020994 | 4/2000 |
| WO | 0113572 | 2/2001 |
| WO | 0113656 | 2/2001 |
| WO | 0141472 | 6/2001 |
| WO | 0167716 | 9/2001 |
| WO | 0171539 | 9/2001 |

OTHER PUBLICATIONS

European Patent Office, Extended European Search Report dated Dec. 29, 2008, in European Patent Application No. 05772129.2.
Barker Brettel, Response to Extended European Search Report dated Jul. 15 ,2009, in European Patent Application No. 05772129.2.
European Patent Office, Examination Report dated Jan. 24, 2011, in European Patent Application No. 05772129.2.
Barker Brettell, Response to Examination Report dated Jul. 15, 2009, in European Patent Application No. 05772129.2.
European Patent Office, Examination Report dated Jun. 10, 2011, in European Patent Application No. 05772129.2.
Barker Brettell, Response to Examination Report dated Sep. 21, 2011, in European Patent Application No. 05772129.2.
Canadian Intellectual Property Office, Examiners Requisition dated Aug. 9, 2011, in Canadian Patent Application No. 2,606,193.
Norton Rose, Preliminary Amendment dated Aug. 1, 2012, filed in U.S. Appl. No. 13/563,926.
Canadian Intellectual Property Office, Notice of Abandonment dated May 3, 2012, issued in Canadian Patent Application No. 2,606,193.
Canadian Intellectual Property Office, Petition for Reinstatement and Response to Examiners Requisition dated Dec. 18, 2012, filed in Canadian Patent Application No. 2,606,193.
United States Patent and Trademark Office, Office Action dated Jan. 29, 2009, issued in U.S. Appl. No. 11/189,113.
Ogilvy Renault, Response to Office Action dated Apr. 29, 2009, filed in U.S. Appl. No. 11/189,113.
United States Patent and Trademark Office, Office Action dated Aug. 27, 2009, issued in U.S. Appl. No. 11/189,113.
Ogilvy Renault, Response to Office Action dated Oct. 29, 2009, filed in U.S. Appl. No. 11/189,113.
United States Patent and Trademark Office, Office Action dated Dec. 17, 2009, issued in U.S. Appl. No. 11/189,113.
Ogilvy Renault, Statement of Substance of Interview, dated Jan. 15, 2010, filed in U.S. Appl. No. 11/189,113.
United States Patent and Trademark Office, Office Action dated Jan. 11, 2010, issued in U.S. Appl. No. 11/189,113.
Ogilvy Renault, Response to Office Action dated Apr. 9, 2010, filed in U.S. Appl. No. 11/189,113.
United States Patent and Trademark Office, Office Action dated Jul. 20, 2010, issued in U.S. Appl. No. 11/189,113.
Ogilvy Renault, Response to Office Action dated Jan. 18, 2011, filed in U.S. Appl. No. 11/189,113.
United States Patent and Trademark Office, Office Action dated Feb. 7, 2011, issued in U.S. Appl. No. 11/189,113.
Ogilvy Renault, Response to Office Action dated May 2, 2011, filed in U.S. Appl. No. 11/189,113.
United States Patent and Trademark Office, Office Action dated May 19, 2011, issued in U.S. Appl. No. 11/189,113.
Ogilvy Renault, Statement of Substance of Interview, dated Jun. 20, 2011, filed in U.S. Appl. No. 11/189,113.
United States Patent and Trademark Office, Office Action dated Jul. 1, 2011, issued in U.S. Appl. No. 11/189,113.
Norton Rose, Response to Office Action dated Sep. 20, 2011, filed in U.S. Appl. No. 11/189,113.
United States Patent and Trademark Office, Office Action dated Dec. 20, 2011, issued in U.S. Appl. No. 11/189,113.
Norton Rose, Response to Office Action dated Jun. 20, 2012, filed in U.S. Appl. No. 11/189,113.
United States Patent and Trademark Office, Notice of Allowance dated Sep. 25, 2012, issued in U.S. Appl. No. 11/189,113.
Method for providing wireless application privilege management; 4 pages.
Feibus, "A Desktop in Your Palm", Informationweek, Aug. 25, 1997, pp. 65ff.
Behr, "Handheld Solutions", Informationweek, Oct. 27, 1997, pp. 106-113.
Moody's Investors Service, Socket Communications Inc.—History & Debt, Investex Report No. 3240276.
Newsletter, E-Mail Merges With Voice Through Infinite Technologies, Voice Technology & Services News, May 26, 1998.
Newsletter, Vodapage: Vodapage demos increasing convergence of pagers and mobile communications at TMA 29, M2 Presswire, Nov. 28, 1996.
Mosher, Microsoft Exchange User's Handbook, Duke Press, 1997, pp. 547-549.
DTS Wireless Website located at D.R.L. http://www.dtswireless.com.
"3Com PalmPilot Gets Wireless Link for E-Mail", Spooner, John G., PC Week, Dec. 8, 1997.
"Have Your Pager Call My Pager", Sullivan, Kristina B., PC Week, Dec. 8, 1997.
Briere, Daniel, et al., "One Mailbox, Just Like Old Times," Network World, vol. 14, issue 16, p. 21 (Apr. 21, 1997).
Padwick, et al., Special Edition Using Microsoft Outlook 97, 1997, Que Corporation, pp. 250-251, 353-367.
News Release, "Motorola Rings in 1995 with the Launch of the Marco® Wireless Communicator," Jan. 4, 1995 (4 pgs.).
Timeline, "FLEX™ Technology Timeline," (3 pgs.).
General Magic, Inc., Corporate Backgrounder, 2001 (2 pgs.).
Pegasus Email Settings, ABSnet Internet Services, Inc. (4 pgs.).
Motorola, Inc., emailVClient, 2001 (4 pages).
News Release, "Motorola Announces Pagewriter 250, The World's Smallest Pager with Full Keyboard", Feb. 27, 1997 (2 pgs.).
Dewey, Barney, "Communications Strategies for Newton 2.0," Newton Technology Journal, p. 10, Jun. 1996.
Press Release, "Motorola Announces New Solutions to Provide Consumers with Wireless Access to Personal and Enterprise E-mail Accounts," Mar. 21, 2001 (4 pgs.).
"Motorola's 'Marco' Wireless Communicator," http://www.msu.edu/-luckie/gallery/marco.htm, Jun. 14, 2001 (3 pgs.).
News Release, "CE Software Announces Mobile Vision," Editorial Contacts, CE Software, Inc., 1995 (3 pgs.).
News Release, "CE Software Ships MobileVision," Jun. 20, 1995 (3 pgs.).
Newton Reference, Communications, 1996-1997(4 pgs.).
PC Pro Issue 31: Realworld Computing, PDA Column, Jul. 30, 1997 (7 pgs.).
Enterprise Solutions for Email Overload, Founder Publications, http://www.amikanow.corporte/publications.htm, Aug. 6, 2001 (9 pgs.).
"Motorola's 'Marco' Wireless Communicator," http://www.msu.edu/-luckie/gallery/marco.htm, Aug. 6, 2001 (2 pgs.).
Press Release, "Apple Agrees to License Newton Technology to Schlumberger, Digital Ocean," Nov. 3, 1995 (3 pgs.).
Frezza, Bill, "PDA, PDA, Wherefore Art Thou, PDA?", Freewire, Aug. 6, 2001 (6 pgs.).
Black, Lauren, et al., "Personal Digital Assistants," Macworld Reviews, Aug. 6, 2001 (5 pgs.).
Reference, "MobileVision Direct Wireless Connection to Your LAN-Based Electronic Mailbox," CE Software, Inc., pp. 1, 3, 5, 7, 9, 11, 13, 15, 17, 19, 21, 1995.
User Manual, "MobileVision Direct Wireless Connection to Your LAN-Based Electronic Mailbox," CE Software, Inc. 1995.
Johnson, David B., "Ubiquitous Mobile Host Internetworking," Fourth Workshop on Workstation Operating Systems, pp. 85-90, Oct. 14-15, 1993.
Johnson, David B., "Mobile Host Internetworking Using IP Loose Source Routing," School of Computer Science, Carnegie Mellon University, pp. 1-14 Feb. 1993.

(56) References Cited

OTHER PUBLICATIONS

Schoettle, Bob, "IP-Address Management on LANs," Byte, pp. 199-200, Feb. 1996.
Cheshire, Stuart, et al., "Internet Mobility 4×4," Computer Science Department, Stanford University, pp. 1-12, Aug. 1996.
Yeom, Hoen Y., et al., "IP Multiplexing by Transparent Port-Address Translator," Proceedings of the Tenth USENIX System Administration Conference, pp. 113-122, Sep. 29-Oct. 4, 1996.
Johnson, David B., "Scalable and Robust Internetwork Routing for Mobile Hosts," IEEE Computer Society, pp. 2-11, 1994.
Egevang, K. et al., "The IP Network Address Translator," Network Working Group, pp. 1-10, May 1994.
Manual, "Server and BBS Software for the Packet Radio" by Jean Paul Roubelat, pp. 1-173.
Book, "Internetwork Mobility the CDPD Approach," by Mark S. Taylor, William Waung, and Mohsen Banan, Jun. 11, 1996.
"BlackBerry Technical White Paper," Research in Motion Ltd., Version 1.0, 1998-1999.
Newsletter, "Battery Friendly Bulletin," vol. 1, Issue 3, pp. 1-7 and unnumbered page, 1999.
Article, Comerford, "Handhelds Duke It Out for the Internet," Wireless Internet, pp. 35-38 and 41, Aug. 2000.
Press Detail, "Extended Systems and Motorola Bring Short-Range Wireless to the Paging E-volution," Jan. 13, 2000 (3 pgs.).
Press Detail, "3Com Corporation Licenses Bluetooth Technology from Extended Systems," Feb. 22, 2000 (2 pgs.).
Web site Article, Hawaleshka, "The Web in Your Pocket," Maclean's, May 15, 2000 (3 pgs.).
Claxton, "Messaging API's for Voice Networks," Telecommunications, pp. 116-120, 1998.
Gifford, David K., et al., "The Application of Digital Broadcast Communication to Large Scale Information Systems," IEEE Journal on Selected Areas in Communications, vol. SAC-3, No. 3, pp. 457-467 (May 1985).
Gifford, David K., et al., "An Architecture for Large Scale Information Systems," ACM, pp. 161-170 (1985).
Aurum, Eric, "The Universal Mailbox Arrives . . . Sort Of," Business Communications Review, pp. 49-52 (May 1996).
"Wireless E-Mail Services Gain Windows Clients," Kramer, Matt, PC Week, Apr. 17, 1995.
Perkins, C. et al., "IMHP: A Mobile Host Protocol for the Internet," Computer Networks and ISDN Systems 27 (1994), pp. 479-491.
Inouye, Jon et al., "System Support for Mobile Multimedia Applications," Proceedings of the IEEE 7th International Workshop on Network and Operating System Support for Digital Audio and Video, May 19-21, 1997, pp. 135-146.
Xu, Kevin Houzhi, "Reliable Stream Transmission Protocols in Mobile Computing Environments," Bell Labs Technical Journal, Summer 1997, pp. 152-163.
Lavana, Hemang et al.., "Internet-Based Workflows: A Paradigm for Dynamically Reconfigurable Desktop Environments," Conference on Supporting Group Work, Proceedings of the International ACM SIGGROUP Conference on Supporting Group Work: The Integration Challenge, Nov. 16-19, 1997, pp. 204-213.
Perkins, Charles E. et al., "Mobility Support in IPv6," International Conference on Mobile Computing and Networking, Proceedings of the Second Annual International Conference on Mobile Computing and Networking, Nov. 11-12, 1996, pp. 27-37.
Goldszmidt, German et al., "*ShockAbsorber*: A TCP Connection Router," Globecom 97, IEEE Global Telecommunications Conference, Nov. 3-8, 1997, pp. 1919-1923.
SAM Reference Manual, System for Automated Messages (Sep. 1989).
IBM Portable Terminal User's Guide, Third Edition (Jun. 1985).
Binder, Richard et al, The Alohanet Menehune, University of Hawaii, Version II (Sep. 1974).
Computer Structures—Principles and Examples, McGraw Hill (1982).
Krebs, Jay, Portable Computer and Host Talk Over Radio-Frequency Link, Electronic, pp. 142-145 (Aug. 25, 1983).
Gadol, Steve, et al. "Nomadic Tenets—A User's Perspective," Sun Microsystems Laboratories, Inc., pp. 1-16 (Jun. 1994).
Declaration of David A. Keeney regarding SAM System, pp. 1-33 (Sep. 3, 2002).
"SAM™ integrates E-mail, Alpha Paging, Fax, and more!", SAM System for Automated Messages (10 pgs.).
SAMpage Manual, version 2.0, TeckNow! (Feb. 1990).
Reiter, Alan A., "Focus on Technology," Telocator (Jan. 1990) (4 pgs.).
Kuehn, Carl, "More than EMail," Southwest Computer & Business Equipment Review, vol. VII, No. 2, (Feb. 1990) (1 pg.).
SAM System for Automated Messages User's Manual (1988) (17 pgs.).
Motorola Operating Instructions for Your "PMR 2000" Series Display Radio Pagers Personal Message Center (2000) (7 pgs.).
Motorola PMR 2000 Personal Message Receiver POCSAG (CCIR Radio Paging Code #1) (1986) (6 pgs.).
Undated, Information Display Pager D40, NEC Corporation (6 pgs.).
Motorola, "Air*Mobile*™ Wireless Comm Guide for cc:Mail" User Guide Version 1.0, Motorola Wireless Data Group, 1995, pp. 3-48.
Motorola, "Air*Mobile*™ Wireless Comm Server for cc:Mail" User Guide Version 1.1, Motorola Wireless Data Group, 1995, pp. 4-46.
Sun Microsystems, JavaMail API Design Specification, Version 1.0, Dec. 9, 1997, Sun Microsystems, Inc., chapters 1-10 appendices A-E.
Compaq, Aero 2100 Series Color Palm-size PC Reference Guide, Second Edition, Aug. 1999, Compaq Corporation.

\* cited by examiner

METHOD FOR PROVIDING WIRELESS APPLICATION PRIVILEGE MANAGEMENT

CROSS-REFERENCE TO RELATED APPLICATIONS

The present application is a continuation of U.S. patent application Ser. No. 13/719,388, which is a continuation of U.S. patent application Ser. No. 11/189,113, which claims priority to and the benefit of U.S. provisional patent application Ser. No. 60/672,084, filed Apr. 18, 2005, the content of all of these documents being incorporated herein by reference in their entirety.

TECHNICAL FIELD

These embodiments relate to the field of wireless device application management.

BACKGROUND

The current methods used to control application configuration and privileges (AC&P) (also referred to as policies) are single dimensional application configuration schemes.

More precisely, either an application configuration and privilege is hard-coded in a given application, through some more flexible configuration process on a per-application basis, or the application configuration and privilege is applied to the whole wireless device itself.

The latter implementation lacks flexibility as all applications share, in such case, the same application configuration and privilege which is a drawback. The skilled addressee will appreciate that depending on the user of a device, it might be desirable to have a given application configuration and privilege for a first given application while for another given application it might be desirable to have another application configuration and privilege.

Furthermore it will be appreciated that in the case where the user device is a wireless user device it is very difficult to control the implementation of the policies for a given user device especially in the case where a large number of user device have to be configured or controlled.

Also, it will be appreciated that a lot of memory is wasted in the case where the policy is hard-coded for each application running on the user device. Furthermore, in such case, it is not possible to control or amend the policy for the application over time which is a major drawback in the case where a user requires more rights.

There is a need for a method that will overcome at least one of the above-mentioned drawbacks.

BRIEF DESCRIPTION OF THE DRAWINGS

Further features and advantages of the embodiments will become apparent from the following detailed description, taken in combination with the appended drawings, in which.

It will be noted that throughout the appended drawings, like features are identified by like reference numerals.

DETAILED DESCRIPTION

According to a broad aspect of the embodiments, there is provided a method for providing an administration policy to a user device comprising a plurality of applications, the method comprising centrally generating said administration policy to be implemented in the user device, the administration policy comprising at least one of an application administration policy to be used by at least one of the plurality of applications and a client administration policy for said user device; and providing the generated policy to said user device.

According to another broad aspect of the embodiments, there is provided a method for implementing an administration policy in a wireless user device comprising a plurality of applications, the method comprising receiving, from a central location, said administration policy to be implemented in the wireless user device, the administration policy comprising at least one of an application administration policy to be used by at least one of the plurality of applications and a client administration policy for said user device; and installing the received policy in the wireless user device.

According to yet another broad aspect of the embodiments, there is provided an application gateway adapted to enable remote administration of one or more managed server units of a data network using a user device of a wireless network, the application gateway comprising: means for managing a provisioning of an administration policy to a user device comprising a plurality of applications, said provisioning comprising: generating said administration policy to be implemented in said user device, said administration policy comprising at least one of an application administration policy to be used by at least one of the plurality of applications and a client administration policy for said user device; and providing said administration policy to said user device.

Figure 1:
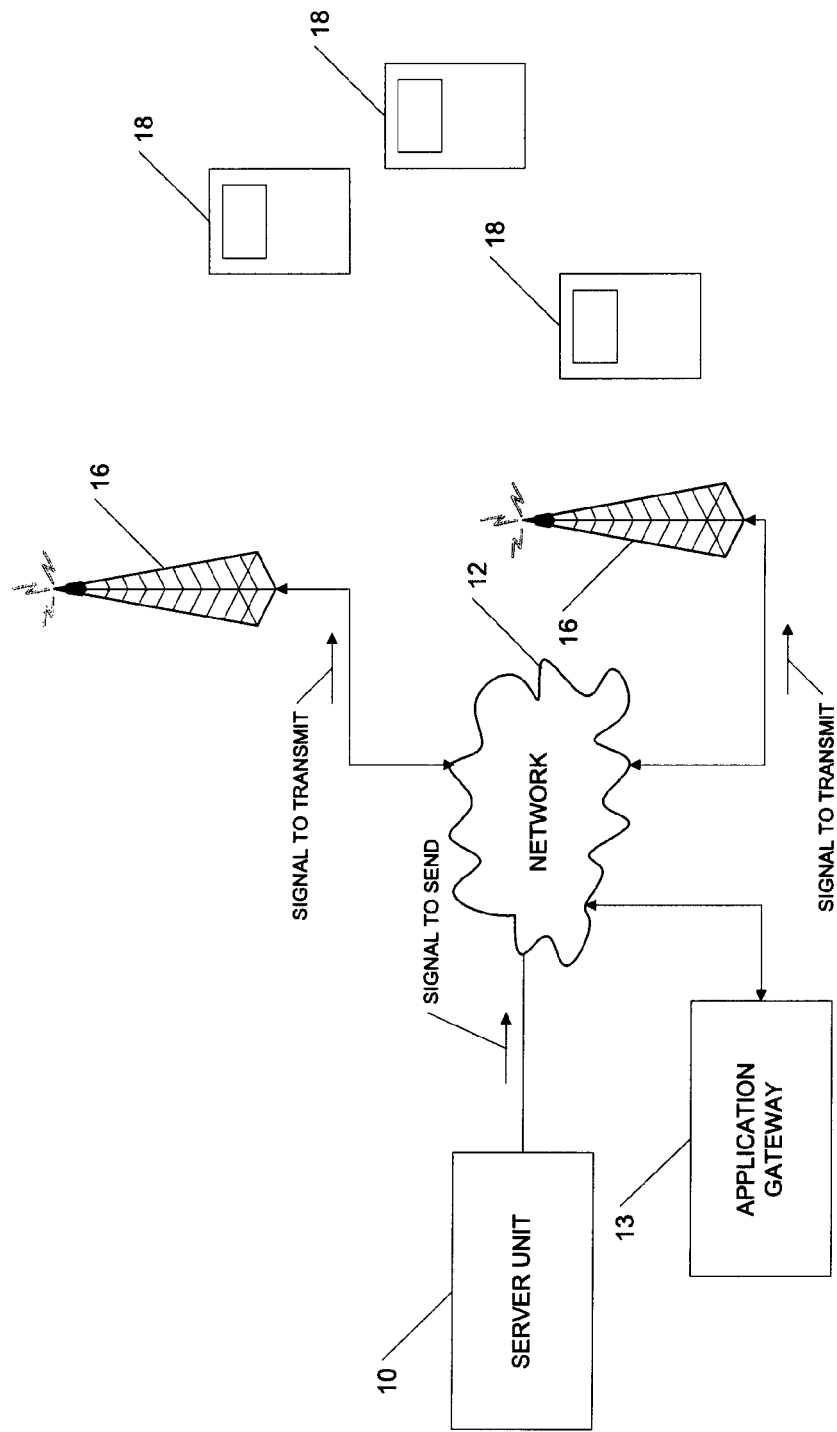
FIG. 1. is a block diagram which shows a plurality of wireless user devices in which the embodiments may be implemented.

Now referring to FIG. 1, there is shown an embodiment of a system wherein the embodiments may be performed advantageously. The system comprises a server unit 10, a network 12, a plurality of transmitting devices 16 and a plurality of user devices 18.

The server unit 10 is adapted for providing a signal to send to the plurality of user devices 18. The server unit 10 may comprise any type of processing unit that is connected permanently or temporarily with the plurality of user devices 18.

The network 12 comprises at least one of a Local Area Network (LAN), a Metropolitan Area Network (MAN) and a Wide Area Network (WAN). In an embodiment, the network 12 comprises a Wide Area Network which is the Internet. Network 12 may also comprise an Application Gateway (not shown).

The plurality of transmitting devices 16 comprises wireless transmitters adapted to transmit data to the plurality of user devices 18. The plurality of user devices comprises devices that are adapted to process at least data. In one embodiment, shown in FIG. 1, the plurality of user devices 18 are wireless user devices. It should be appreciated that various types of devices may be used such as Personal Digital Assistants (PDAs), smart phones, etc. In an embodiment, the plurality of user devices 18 comprises Blackberry™ devices which are manufactured by Research In Motion Limited. It will be appreciated by the skilled addressee that the plurality of user devices 18 comprises a plurality of applications, each operating according to policies that may be implemented and monitored by an operator according to the method disclosed hereinafter.

More precisely, the server unit 10 is adapted to provide to the network 12, inter alia, a signal to send. At least one of the plurality of transmitting devices 16 is adapted to transmit a signal to at least one of the plurality of user devices 18.

The application gateway 13 of network 12 handles request/response messages initiated by the applications on the devices 18, as well as subscription notifications pushed to the devices 18 from the server unit 10. The Application Gateway can function as a Data Mapping Server for mediating messaging between a client runtime environment (RE) on the devices 18 and a backend server of server unit 10. The Runtime Environment (RE) is an intelligent container that executes application components and provides common services as needed for execution of the applications. The application gateway can provide for asynchronous messaging for the applications and can integrate and communicate with legacy server units such as server unit 10. The devices 18 transmit and receive wireless component applications, as further described herein, as well as transmit/receive messaging associated with operation of the applications. The devices 18 can operate as web clients of the server unit 10 through execution of the applications when provisioned on respective runtime environments (RE) of the devices 18. As described further herein, application gateway 13 may be adapted to provide a policy administration service to client devices 18 providing policies over the air, for example, to control application administrative policies and client administrative policies independently.

Figure 2:
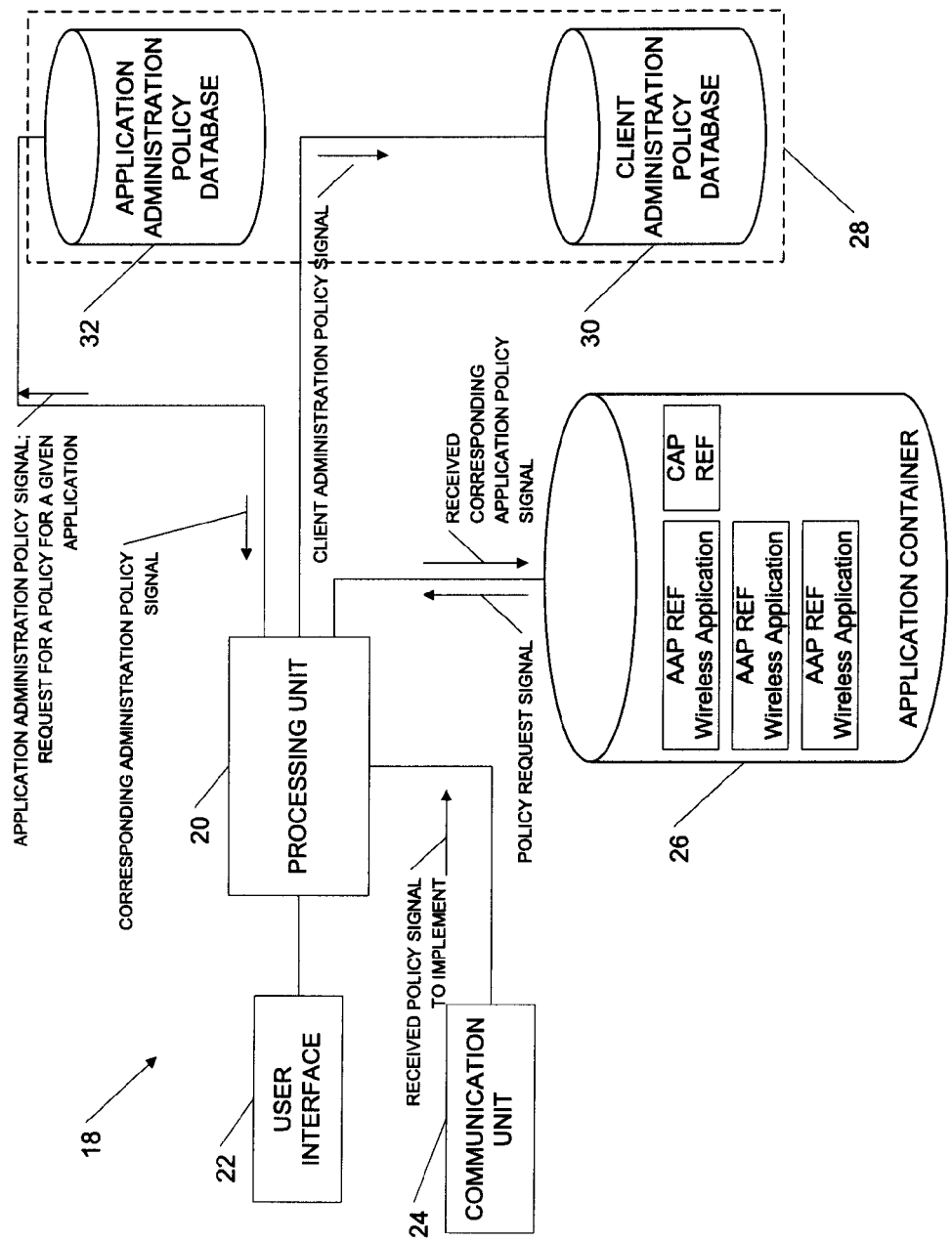
FIG. 2 is a block diagram which shows an embodiment of a user device in which the method for providing a wireless privilege management may be advantageously used; the user device comprises, inter alia, an application administration policy database and a client administration policy database.

Now referring to FIG. 2, there is shown an embodiment of a user device 18 in which the method for providing an administration policy may be advantageously used.

The user device 18 comprises a processing unit 20, a user interface 22, a communication unit 24, an application container 26 and a policy storing database 28. The processing unit 20 is adapted to process data. The processing unit 20 may be any suitable processor. The user interface 22 is adapted to provide an interface to a user using the user device 18 for interacting with at least one application. In an embodiment, the user device 22 comprises a keyboard.

The communication unit 24 is adapted to provide communication capability between the user device 18 and at least one transmitting device 16. In an embodiment, the communication unit 24 is a wireless communication interface.

The application container 26 provides a RE for executing a plurality of applications in the user device 18. The skilled addressee will appreciate that application container 26 may facilitate the execution of applications providing various functionality but particularly those suitable for communicating with remote data sources such as web services and the like through a stateful proxy such as the application gateway.

The policy storing database 28 comprise a client administration policy database 30 and an application administration policy database 32.

It will be appreciated that the client administration policy comprised in the client administration policy database 30 is used to manage administration and privilege of the user device 18 at the user level.

It will be further appreciated that the application administration policy comprised in the application administration policy database 32 is used to provide a management of an individual application.

More precisely, the communication unit 24 provides a received policy signal to implement to the processing unit 20. In response to the received policy signal to implement, the processing unit 20 provides a client administration policy signal to the client administration policy database 30. The processing unit 20 further provides an application administration policy signal to the application administration policy database 32.

An application of the application container 26 may provide an administration policy request signal to the processing unit 20. It will be appreciated that in an embodiment, the policy request signal comprises an indication of a given policy to use to uniquely identify a pertinent policy to use. In response to the policy request signal provided to the processing unit 20, the latter provides a request for a policy for a given application to the application administration policy database 32. It will be appreciated that in an embodiment, the request for a policy for a given application comprises an indication of the given policy to use.

In response to the request for a policy for a given application, the application administration policy database 32 provides a corresponding administration policy signal for the given application to the processing unit 20. The processing unit 20 then provides a received corresponding application policy signal to the application comprised in the application container 26.

Figure 3:
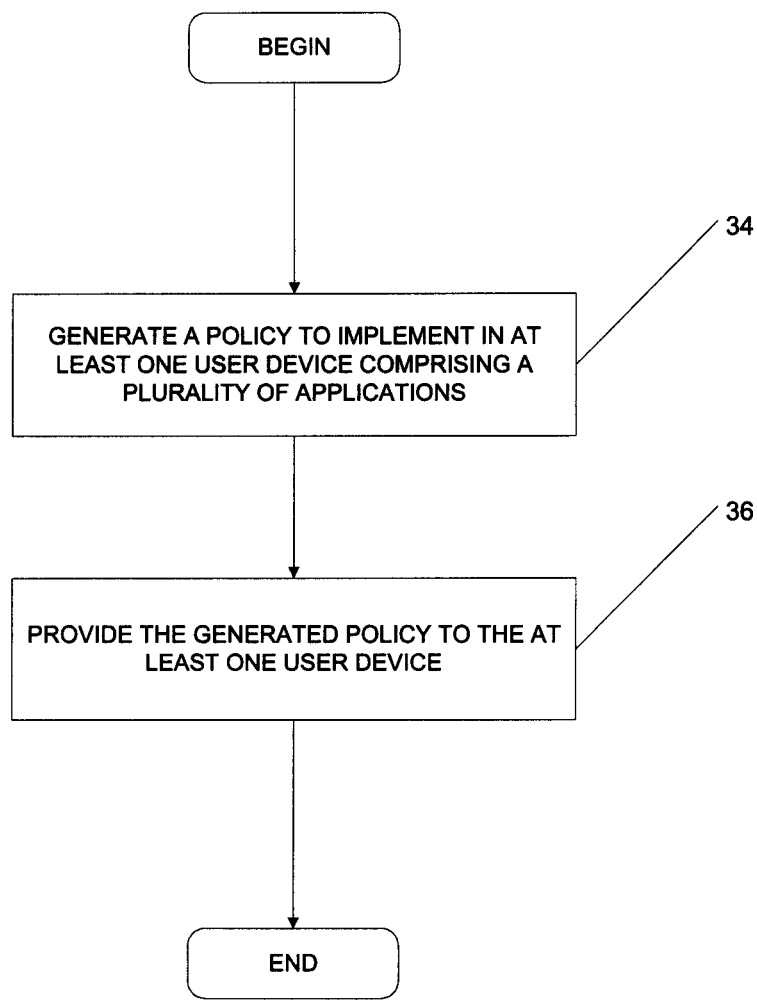
FIG. 3 is a flowchart which shows how a policy is provided to a user device according to one embodiment.

Now referring to FIG. 3, there is shown how a policy is provided to a user device 18 according to one embodiment.

According to step 34, an administration policy to implement in at least one user device comprising a plurality of applications is generated. In an embodiment, the policy to implement in at least one user device is generated by an operator using the server unit 10. The operator generates the policy to implement according to various information such as a type of application to use in the wireless user device, type of user operating the wireless user device, etc.

According to step 36, the generated policy is provided to at least one device.

Figure 4:
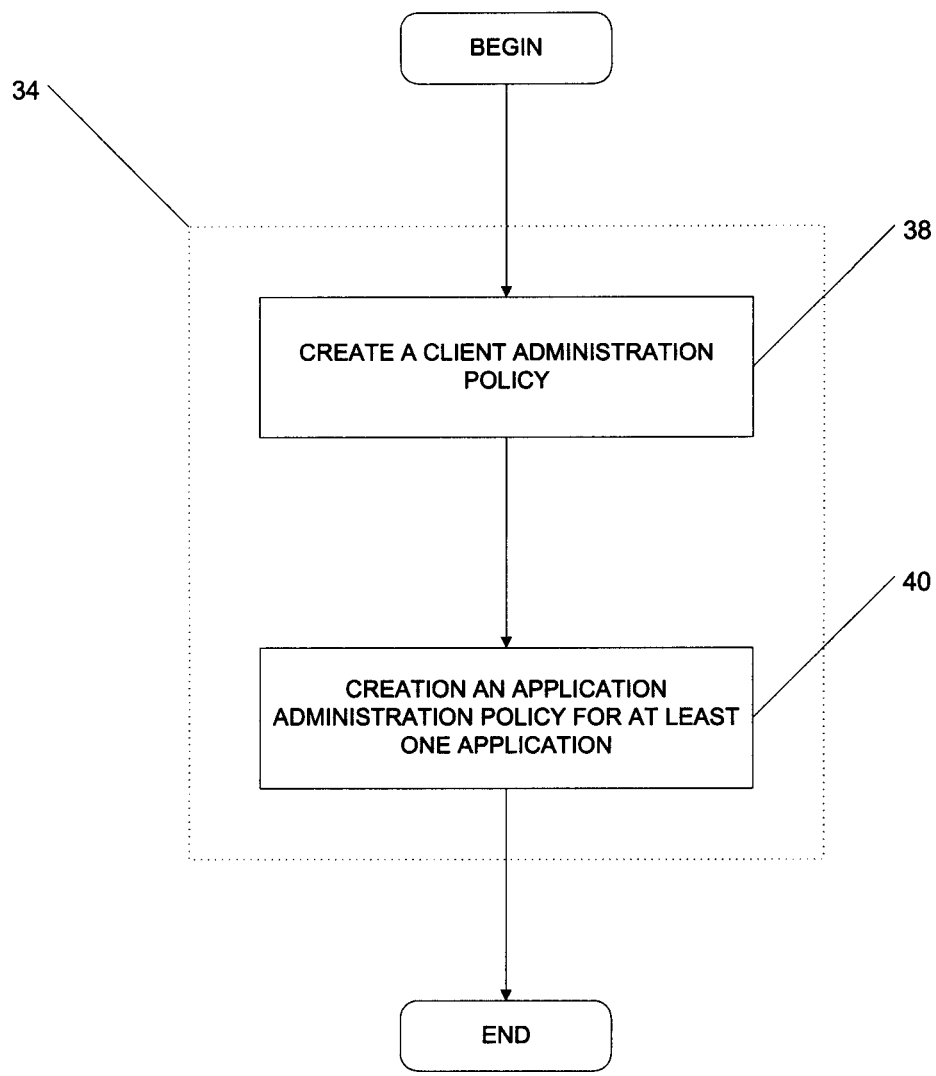
FIG. 4 is a flowchart which shows how a policy is generated according to an embodiment; according to first step, a client administration policy is created and according to a second step an application administration policy is created.

Now referring to FIG. 4, there is shown how a policy is generated according to an embodiment.

More precisely, according to step 38, a client administration policy is created. As mentioned earlier, the client administration policy is created by an operator.

According to step 40, an application administration policy is created for at least one application. As mentioned earlier the application administration policy is created by an operator.

While it has been shown that the client administration policy is created prior to the application administration policy for the at least one application, the skilled addressee would appreciate that it may be possible to create the application administration policy for the at least one application prior to the creating of the client administration policy.

Figure 5:
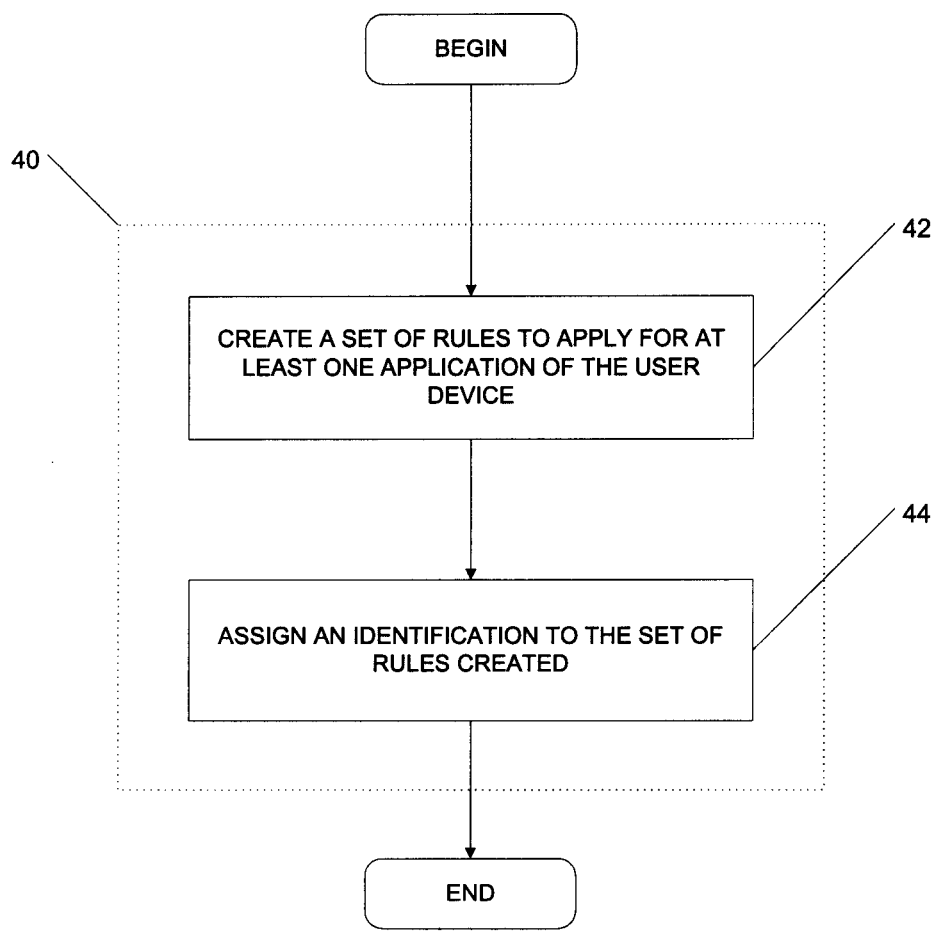
FIG. 5 is a flowchart which shows how the application administration policy is created according to an embodiment.

Now referring to FIG. 5, there is shown how the application administration policy is created according to an embodiment.

According to step 42, a set of rules to apply to for at least one application of the user device is created. It will be appreciated that preferably the operator is creating the set of rules.

According to step 44, an identifier is assigned to the set of rules created. It will be appreciated that the identifier is created manually by the operator in an embodiment while in another embodiment, the identifier may be created automatically. It will be further appreciated that the identifier may be any one of a number, a character string, or the like. It will be appreciated that the identifier is used to uniquely identify the set of rules that was created according to step 42.

Figure 6:
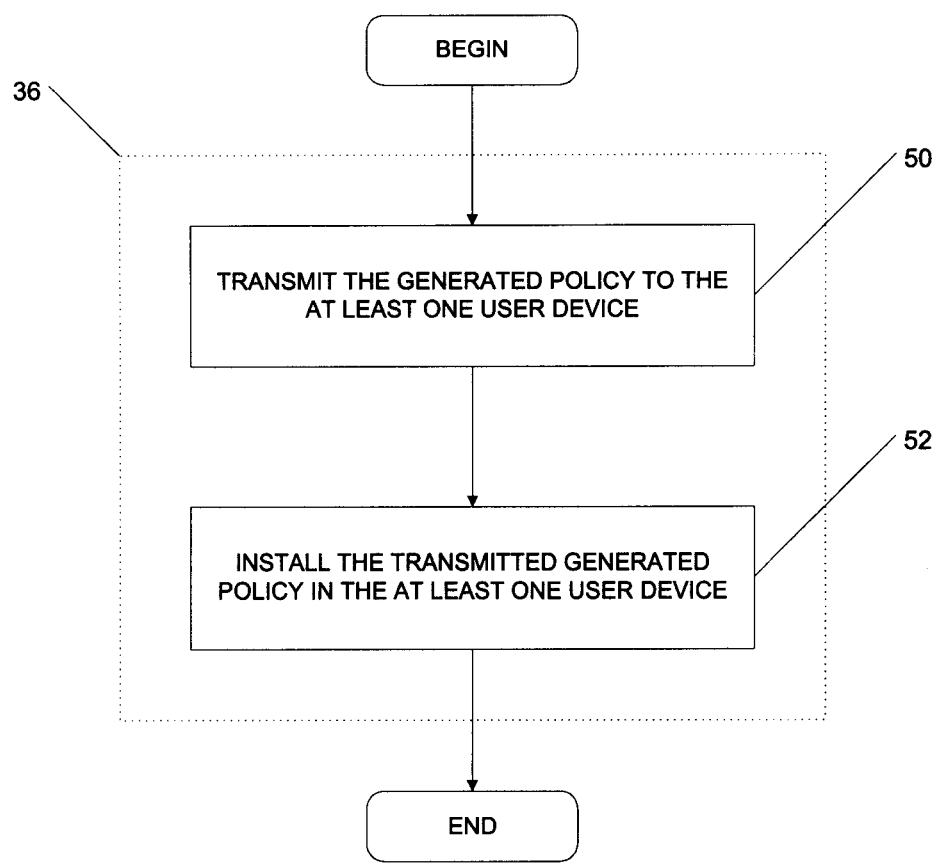
FIG. 6 is a flowchart which shows how a generated policy is provided to the at least one user device; according to a first step the generated policy is transmitted to the at least one user device while according to a second step the transmitted policy is installed in the user device.

Now referring to FIG. 6, there is shown how a generated policy is provided to at least one user according to an embodiment.

According to step 50, the generated policy is transmitted to the at least one user device. It will be appreciated that in an embodiment, the generated policy to the at least one user device is transmitted over a wireless link. More precisely, the generated policy is transmitted from the server unit 10 to one of the transmitting unit 16 via the network 12 and then to the user device 18 over the wireless link. In such case, the communication unit 24 receives a policy signal to implement and provides the received policy signal to implement to the processing unit 20.

According to step 52, the transmitted generated policy is installed in the at least one user device 18. In an embodiment, the transmitted generated policy is installed in a policy storing database 28.

Figure 7:
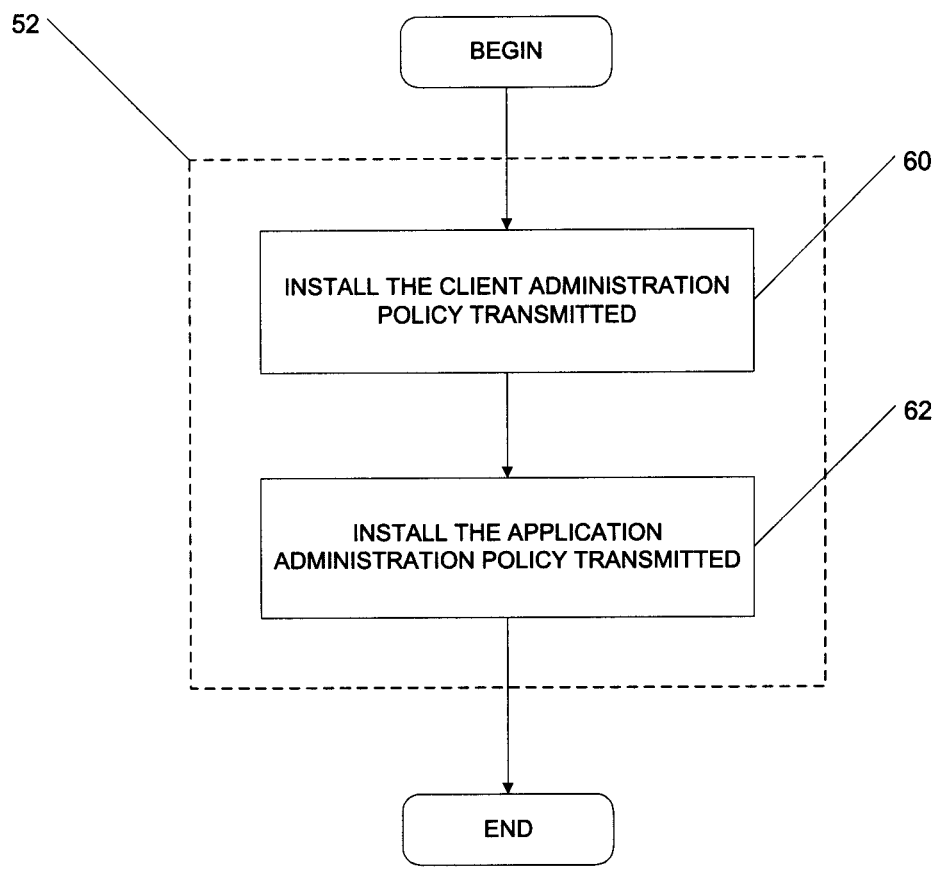
FIG. 7 is a flowchart which shows how the transmitted policy is installed in the user device.

Now referring to FIG. 7, there is shown an embodiment which shows how the transmitted policy is installed in the user device 18.

According to step 60, the client administration policy transmitted is installed. In an embodiment, the client administration policy transmitted is installed in the client administration policy database 30.

According to step 62, the application administration policy transmitted is installed. In an embodiment, the application administration policy transmitted is installed in the application administration policy database 32.

While it has been disclosed that the client administration policy transmitted is installed prior the application administration policy transmitted, the skilled addressee should appreciate that the application administration policy transmitted might be installed prior to the client administration policy transmitted.

Moreover, the skilled addressee will appreciate that the client administration policy may be transmitted at a different time than the application administration policy. The skilled addressee will therefore appreciate that such method provides a central administrative control over access right and functional privilege of wireless applications especially those that interact with a server and/or service provider of the user device 18.

It is therefore much easier and efficient to be able to control a policy of a large number of user devices 18. Furthermore, using an over the air strategy may be very convenient as it enables a quick enforcement of a policy to a large number of wireless user devices.

Furthermore, the skilled addressee will appreciate that such method enables to have a two dimensional control of privileges. The skilled addressee will further appreciate that the fact that client administration policy database 30 and the application administration policy database 32 are stored separately from an individual application enable them to be updated over the air at any time.

It will be further appreciated that a plurality of applications of the application container 26 might share a same application administration policy. The use of the identification disclosed at step 44 enables therefore more than one application to share a given application administration policy and therefore minimizes the usage of storage space in the user device 18, which is greatly appreciated.

Moreover, such reuse of application administration policy by more than one application minimizes air-time usage and download time which is advantageous for the operator of a plurality of user devices 18.

Also, the fact that the application administration policy database 32 is separated from the client administration policy database 30 enables each of the two to be updated independently from one another again minimizing airtime usage as well as download time. Though described with reference to an application gateway which performs a plurality of services (e.g. administration services provisioning RE with policies etc., proxy and other communications services including mapping messages for facilitating communications between clients and remote servers, etc.), other network servers may be adapted to provide one or more of such services.

While illustrated in the block diagrams as groups of discrete components communicating with each other via distinct data signal connections, it will be understood by those skilled in the art that embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiments.

It should be noted that the embodiments can be carried out as a method, can be embodied in a system, a computer readable medium or an electrical or electro-magnetical signal.

The embodiments described above are intended to be exemplary only. The scope of the embodiments is therefore intended to be limited solely by the scope of the appended claims.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyright rights whatsoever.

We claim:

1. A system for implementing an administration policy on a user device, the administration policy comprising at least one application administration policy used to provide management of at least one application in a runtime environment implemented on the user device and at least one runtime environment administration policy used to manage administration of the runtime environment, the system comprising:
a server having a processor coupled to a memory, the processor for executing computer-readable instructions to cause the server to:

generate an application administration policy for a specific application including an identifier for the application administration policy; and transmit the application administration policy and the identifier to the user device;

the user device having a processor coupled to a memory, the processor for executing computer-readable instructions to cause the user device to:

receive and store in an administration policy database in the user device memory the application administration policy and the identifier;

receive an application administration policy request signal including the identifier for the specific application administration policy to use for the specific application; and provide the application administration policy indicated by the identifier to the specific application.

2. The system of claim 1, wherein there are at least two different application administration policies and at least one of the at least two different application administration policies is implementable for at least a first application concurrently with implementation of at least one different application administration policy for at least a second application.

3. The system of claim 1 wherein the application administration policy provides common management of two or more applications.

4. The system of claim 1, further comprising a plurality of additional application administration policies, each being uniquely identified using an identifier.

5. The system of claim 1, wherein the administration policy database comprises an application administration policy database that is distinct from a runtime environment administration policy database; wherein the application administration policy database is for storing the at least one application administration policy, and the runtime environment administration policy database is for storing the at least one runtime environment administration policy.

6. The system of claim 1, wherein the instructions further cause the server to:

generate a runtime environment administration policy; and transmit the runtime environment administration policy to the user device, and the instructions further cause the user device to:

receive from the server and store in the memory the runtime environment administration policy.

7. The system of claim 6, wherein the instructions further cause the user device to:

install the runtime environment administration policy.

8. The system of claim 6, wherein at least one of the application administration policy and the runtime environment administration policy is received over a wireless link.

9. A method for generating an administration policy at a server and implementing the administration policy on a user device, the administration policy comprising at least one application administration policy used to provide management of at least one application in a runtime environment implemented on the user device and at least one runtime environment administration policy used to manage administration of the runtime environment, the method comprising:

at the server:

generating an application administration policy for a specific application and an identifier for the application administration policy; and transmitting the application administration policy and the identifier to the user device;

at the user device:

receiving and storing in an administration policy database the application administration policy and the identifier;

receiving an application administration policy request signal including the identifier for the specific application administration policy to use for the specific application; and providing the application administration policy indicated by the identifier to the specific application.

10. The method of claim 9, wherein there are at least two different application administration policies, and at least one of the at least two different application administration policies is implementable for at least a first application concurrently with implementation of at least one different application administration policy for at least a second application.

11. The method of claim 9 wherein the application administration policy provides common management of two or more applications.

12. The method of claim 9, wherein there are a plurality of additional application administration policies, each being uniquely identified using an identifier.

13. The method of claim 9, wherein the administration policy database comprises an application administration policy database that is distinct from a runtime environment administration policy database; wherein the application administration policy database is for storing the at least one application administration policy, and the runtime environment administration policy database is for storing the at least one runtime environment administration policy.

14. The method of claim 9, further comprising, at the server:

generating a runtime environment administration policy; and transmitting the runtime environment administration policy to the user device, and at the user device:

receiving from the server and storing the runtime environment administration policy.

15. The method of claim 14, further comprising at the user device:

installing the runtime environment administration policy.

16. The method of claim 14, wherein at least one of the application administration policy and the runtime environment administration policy is received over a wireless link.

17. A server for implementing an administration policy on a user device, the administration policy comprising at least one application administration policy used to provide management of at least one application in a runtime environment implemented on the user device and at least one runtime environment administration policy used to manage administration of the runtime environment, the server comprising:

a processor coupled to a memory, the processor for executing computer-readable instructions to cause the server to:

generate an application administration policy for a specific application and an identifier for the application administration policy; and transmit the application administration policy and the identifier to the user device for storage in an administration policy database.

18. The server of claim 17, wherein there are at least two different application administration policies and at least one of the at least two different application administration policies is implementable for at least a first application concurrently with implementation of at least one different application administration policy for at least a second application.

19. The server of claim 17 wherein the application administration policy provides common management of two or more applications.

20. The server of claim 17, further comprising a plurality of additional application administration policies, each being uniquely identified using an identifier.

21. The server of claim 17, wherein the instructions further cause the server to:
generate a runtime environment administration policy; and
transmit the runtime environment administration policy to the user device.

22. The server of claim 21, wherein at least one of the application administration policy and the runtime environment administration policy is transmitted over a wireless link.

23. A method for generating an administration policy at a server for implementation on a user device, the administration policy comprising at least one application administration policy used to provide management of at least one application in a runtime environment implemented on the user device and at least one runtime environment administration policy used to manage administration of the runtime environment, the method comprising:
generating an application administration policy for a specific application and an identifier for the application administration policy; and
transmitting the application administration policy and the identifier to the user device for storage in an administration policy database.

24. The method of claim 23, wherein there are at least two different application administration policies and at least one of the at least two different application administration policies is implementable for at least a first application concurrently with implementation of at least one different application administration policy for at least a second application.

25. The method of claim 23 wherein the application administration policy provides common management of two or more applications.

26. The method of claim 23, wherein there is a plurality of additional application administration policies, each being uniquely identified using an identifier.

27. The method of claim 23, further comprising:
generating a runtime environment administration policy; and
transmitting the runtime environment administration policy to the user device.

28. The method of claim 27, wherein at least one of the application administration policy and the runtime environment administration policy is transmitted over a wireless link.

29. A non-transitory computer readable memory containing instructions for generating an administration policy at a server for implementation on a user device, the administration policy comprising at least one application administration policy used to provide management of at least one application in a runtime environment implemented on the user device and at least one runtime environment administration policy used to manage administration of the runtime environment, the instructions which when executed by a processor of the server perform the method of:
generating an application administration policy for a specific application and an identifier for the application administration policy; and
transmitting the application administration policy and the identifier to the user device for storage in an administration policy database.

* * * * *